United States Patent [19]

Ohtsuka et al.

[11] Patent Number: 4,707,748

[45] Date of Patent: Nov. 17, 1987

[54] IMAGE RECORDING APPARATUS

[75] Inventors: Yasumasa Ohtsuka; Masaharu Ohkubo, both of Yokohama, Japan

[73] Assignee: Canon Kabushiki Kaisha, Tokyo, Japan

[21] Appl. No.: 828,871

[22] Filed: Feb. 12, 1986

[30] Foreign Application Priority Data

Feb. 14, 1985 [JP] Japan ............................... 60-027053
Feb. 14, 1985 [JP] Japan ............................... 60-027054

[51] Int. Cl.[4] ........................ G03G 15/08; H04N 1/21

[52] U.S. Cl. ................................ 358/298; 355/3 DR; 355/14 D; 358/296

[58] Field of Search ....................... 358/296, 298, 300; 355/3 DR, 14 D, 3 DD, 3 R, 14 R

[56] References Cited

U.S. PATENT DOCUMENTS 4,538,896 9/1985 Tajima et al. ....................... 355/3 R
4,551,000 11/1985 Kanemitsu et al. ......... 355/3 DR X
4,626,096 12/1986 Ohtsuka et al. .................. 355/14 D

*Primary Examiner*—E. A. Goldberg
*Assistant Examiner*—Linda M. Peco
*Attorney, Agent, or Firm*—Fitzpatrick, Cella, Harper & Scinto

[57] ABSTRACT

An image recording apparatus. A disposable part is detachably mounted therein. The apparatus includes a photosensitive member which is imagewisely exposed to a dots of beam in accordance with the signal of the image to be recorded. A counter counts clockpulses during the time when the signal of the image to be recorded being produced. Utilizing the output of the counter, the signal corresponding to the degree of consumption of the disposable or consumable part is generated.

14 Claims, 9 Drawing Figures

IMAGE RECORDING APPARATUS

FIELD OF THE INVENTION AND RELATED ART

The present invention relates to an image recording apparatus wherein a photosensitive member is imagerwise exposed to light modulated in accordance with signals to be recorded.

FIG. 1 is a sectional view of a so-called laser beam printer as an example of the image recording apparatus. The apparatus includes a photosensitive drum 101 as an image bearing member, which is rotatable in the direction indicated by an arrow and includes an electrophotographic photosensitive layer 102 and a substrate 103. Around the outer surface of the photosensitive drum 101, there is provided a primary charger for uniformly charging the photosensitive drum 101. The photosensitive drum 101 thus charged electrically is exposed to a laser beam produced by a semiconductor laser 2 and modulated in accordance with image signals. The laser beam scans the photosensitive drum 101 using a scanner 114 including a polygonal mirror or galvano mirror or the like to form an electrostatic latent image on the photosensitive drum 101. The electrostatic latent image thus formed is made visible by a developing device containing a predetermined amount of toner in a toner containing portion 106". This toner is carried on a developing roller 106' in the form of a sleeve rotatable in the direction indicated by an arrow so as to supply the toner to the photosensitive drum 101. The developed image is transferred onto a transfer material (not shown) fed along the transfer material guide 108, by a transfer charger 107. After receiving the toner image (developed image) from the photosensitive drum 101, the transfer material advances to an unshown image fixing device. The surface of the photosensitive drum 109 carrying thereon the residual toner not transferred to the transfer material is cleaned by a cleaning device 109 so that the residual toner is removed therefrom, the removed toner being collected in the cleaning device.

In this type of apparatus, the photosensitive drum 101, the developing device 106 and the cleaner 109 or the like therearound are worn or contaminated by toner particles or the like, and therefore it is necessary to conduct periodical maintenance operations and to replace the worn out parts and to clean various parts. Thus, a heavy burden has been imposed in the maintenance operation.

It has been proposed that the photosensitive drum 101 and process means such as the primary charger 104, the developing device 106 and the cleaner 109 or the like, which are operated together with the photosensitive drum 101, are assembled in a casing as a unit to form a process cartridge 112, which is disposable. By doing so, the maintenance operations are made easy. The process cartridge 112 may be guided and supported along a guide rail securedly fixed in the main frame of the image recording apparatus, when the process cartridge 112 is mounted into or demounted from the main frame 100.

In order to note the time of replacing the process cartridge 112, a warning is produced in response to an integral number of photosensitive drum 101 rotations reaching a predetermined level, whereby the user is informed that he should prepare for the replacement of the cartridge with new one.

It is true that the number of rotations of the photosensitive drum 101 corresponds to a certain extent to the deterioration of the photosensitive drum 101, the toner consumption of the developing device 106, the amount of the toner removed by the cleaner 109, that is, to the degree of consumption of wearing of the cartridge 112. But it has been difficult to detect it with precision. Accordingly, there has been a problem that the toner cartridge which is still usable is replaced when the warning lamp turns on; and conversely, the process cartridge may have been warn out without the warning lamp turned on.

In the image recording apparatus in the type wherein a photosensitive drum is imagewise exposed to a laser beam or the beam emitted from a light emitting diode from an image to be copied, and the toner particles are deposited in the area exposed to the beam, thus making the image visible, it has been proposed that the toner consumption be detected by counting the number of dots of the laser beam or the light emitting diode beam projected on the photosensitive drum (Japanese Patent Laid-Open Application No. 224363/1983). In this apparatus, it is assumed that the toner consumption per one dot is constant, and a predetermined number of dots is corresponds to a predetermined consumption of the toner, whereby the remaining amount of the toner is detected on the basis of the number of the dots.

However, the period of the beam of the laser or the light emitting diode being produced per one dot can vary depending on individual devices. For example, as shown in FIG. 2, the length of the dot in the scanning direction (X direction) can be different due to the variation of the values of the resistance and capacitance in the individual electric circuit. Therefore, the integrated number of the dots does not accurately correspond to the toner consumption, the service life of the photosensitive drum or the amount of the toner collected in the cleaning device.

In a printer of the above-described type using the laser or other light emitting element, it is possible to produce a halftone image by changing the duty of the light producing period, as shown in FIG. 3, for example, wherein a reference numeral (2) indicatesa one-dot signal for a high image density picture element; (1) is that for a half density picture element; and (0) indicates a zero level corresponding to the background of the original. As will be understood, the time length of the signal 1 is shorter than that of the signal (2).

When the picture element signal for producing the modulated beam can take different levels, the lighting period varies, so that the integrated number of dots does not correctly correspond to the toner consumption, the remaining service life of the photosensitive drum, the amount of the residual toner corrected in the cleaning device.

SUMMARY OF THE INVENTION

Accordingly, it is a principal object of the present invention to provide an image recording apparatus in the type wherein a disposable part or parts are used, wherein more correct time of replacement can be detected.

It is another object of the present invention to provide an image recording apparatus in the type wherein a disposable cartridge, which contains a photosensitive member and at least one of electrophotographic process means, is demountably mounted therein, and wherein a more accurate time of the process cartridge replacement can be provided.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
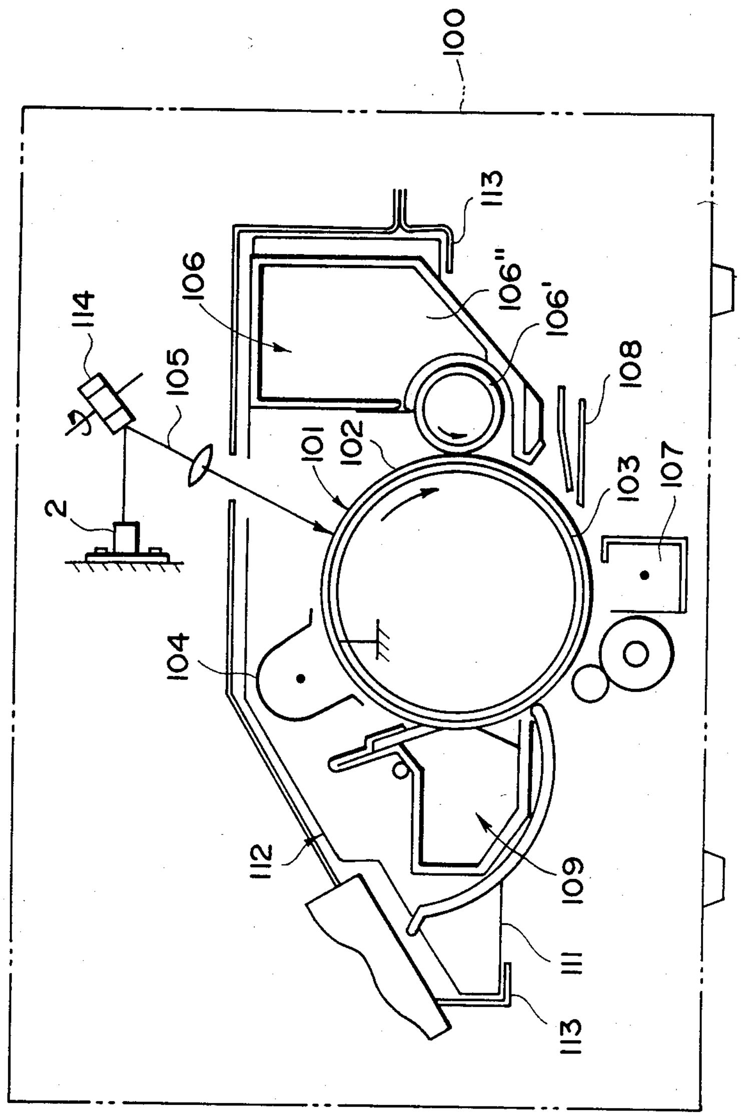
FIG. 1 is a sectional view of a conventional laser beam printer.
Figure 2:
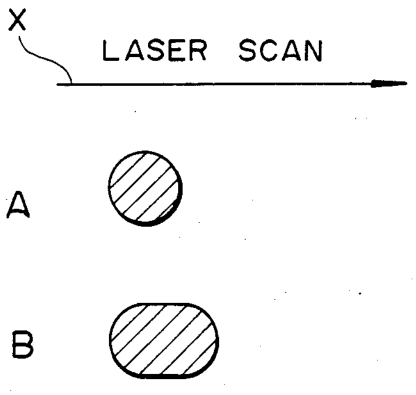
FIG. 2 is a plan view showing a difference in the area exposed to the laser beam for one picture element.
Figure 4:
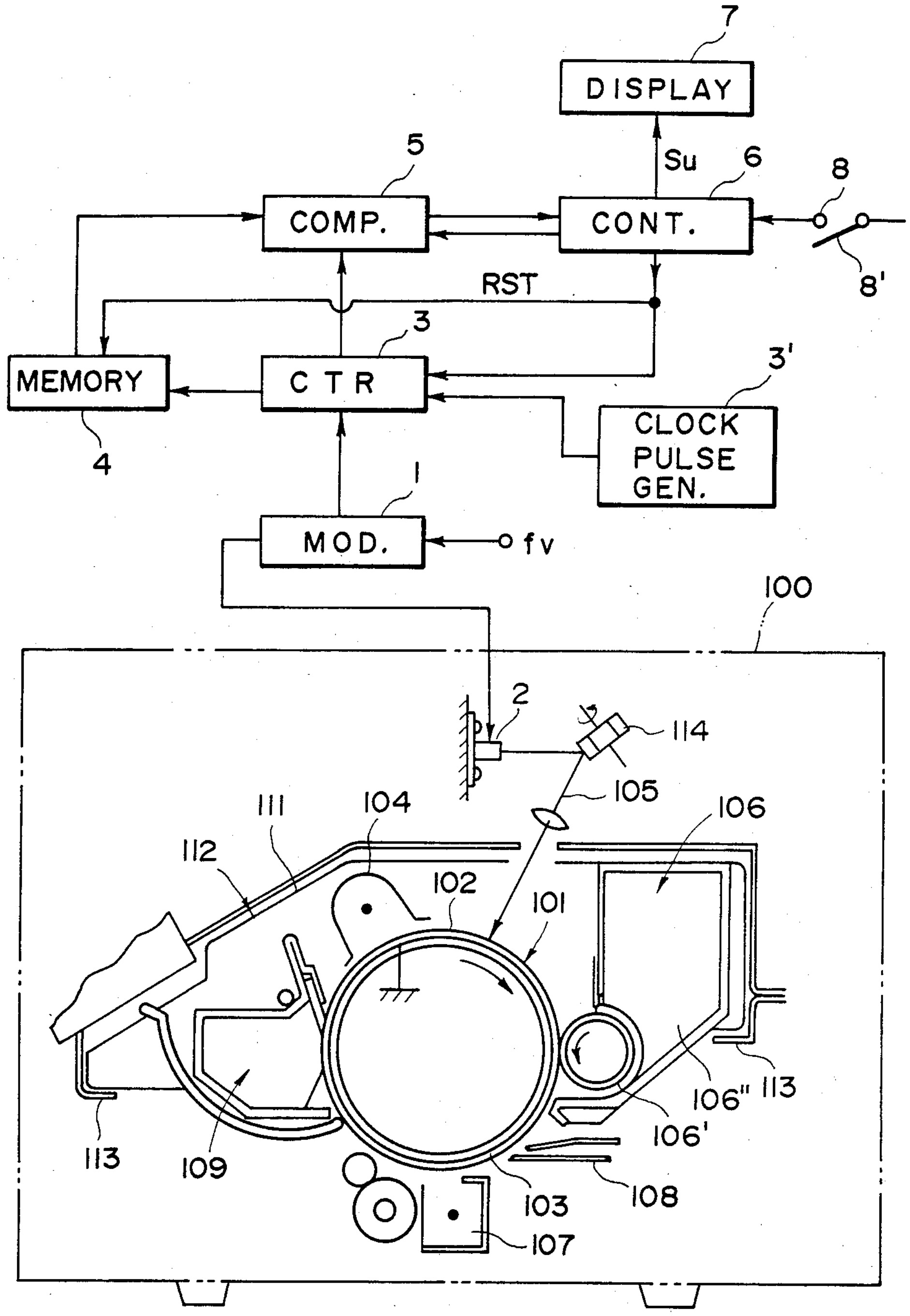
FIG. 4 is a partly schematic sectional view of an image recording apparatus according to an embodiment of the present invention.

FIG. 4 is a partly schematic illustration of an image recording apparatus according to an embodiment of the present invention, wherein the same reference numerals as in FIG. 1 are assigned to the elements having the corresponding functions for the sake of simplicity of explanation. In this Figure, similarly to FIG. 1, a support for mounting the guide 113, a table for supporting the scanner 114, the frame or the like in the apparatus 100 are not shown for the sake of simplicity, since known means may be used for those parts.

Figure 3:
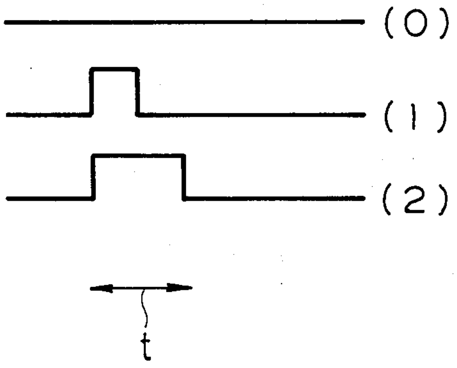
FIG. 3 illustrates an example of a multi-level image signal.

In FIG. 1, the image recording apparatus comprises a modulator which receives an image signal fv from an unshown computer or the like and modulates it into a laser input voltage rendering the laser on and off in response to the image signal fv. As for the image signal, a multi-level signal can be used, as shown in FIG. 3. More particularly, for a high image density, the beam emitting period per one dot is relatively long, whereas it is relatively short for the half level density part. The multi-level may consist of three or more levels correspondingly to the levels of the image density. The apparatus further comprises a laser which is a semiconductor laser, in this embodiment, coupled to the modulator 1 to generate a modulated beam in accordance with the modulated signal, and a counter responsive to the time information corresponding to the exposure period of time that the photosensitive drum 101 is exposed to the laser beam produced from the laser 2. To the counter 3, a clockpulse generator 3' in the form of a crystal oscillator transmits clock pulses, and the counter counts the clockpulses produced thereby during the period the laser generates an output voltage in response to the image signal (image signal). Also connected to the counter 3, is a memory for sequentially adding and memorizing the outputs from the counter 3. The memory 4 is connected to a comparator (comparing means). The comparator 5 is connected to a controller 6 which contains a predetermined signal level (reference signal) corresponding to a predetermined amount of toner consumption which is predetermined so as to be slightly smaller than the amount of toner originally contained in the developer 106. The comparator 5 compares the signal level of the time information corresponding to the integral exposure period of time stored in the memory 4 with the reference signal. If the integrated period of exposure stored in the memory 4 is longer than the period corresponding to the predetermined amount of the toner, that is, if the signal level of the time or period information stored in the memory 4 becomes higher than the referenced signal level, the comparator 5 produces a signal to the controller 6. In response to this, the controller 6 produces a signal Su indicating that the process cartridge should be exchanged. The signal Su drives a display means 7 such as a visible means such as a light emitting diode (LED) and means for producing a warning sound. The controller 6 and the memory 4 are connected so that when the user replaces the cartridge, and therefore, a signal 8 is produced, the controller 6 produces a reset signal RST to the memory 4, in response to which the memory 4 is restored so that the exposure period is returned to zero. The signal 8 may be produced in response to the user actuating a switch 8'. Means and elements indicated by the reference numerals 1, 3, 3', 4, 5, 6, 7, 8' are constructed on a print substrate contained in the main frame 100.

In operation, an image signal fv is introduced into the laser 2 by way of the modulator 1. Then the laser 2 produces a laser beam corresponding to the image signal fv. Simultaneously the counter 3 counts the clockpulses corresponding to the image signal from the modulator 1 to drive the laser 2, and the laser emitting period of time is added in the memory 4 which is originally set to zero.

The laser beam produced by the laser 2 scans the photosensitive drum 101 so as to form an electrostatic latent image on the surface of the photosensitive drum 101, and the electrostatic latent image is developed by depositing the toner particles to the electrostatic latent image, thus forming a visualized toner image. In the laser beam printer in this embodiment, the toner particles are deposited on an area of the photosensitive drum 101 that is exposed to the laser beam. Therefore, the toner is electrically charged to the same polarity as the polarity to which the photosensitive drum 101 is electrically charged by the primary charger 104. The development is, therefore, a so-called reversal development. Accordingly, the consumption of the toner is proportional to the beam emitting period of the laser 2. With the increase of the integrated period of beam projection by the laser 2, the toner consumption increases. When total exposure period stored in the memory 4 exceeds the reference level preset corresponding to the predetermined consumption of the toner, a signal requiring replacement of the process cartridge 112 is produced by the controller 6.

The consumption during a laser emitting period for a line image is different from that for a solid black image, although the difference is not large.

Figure 5:
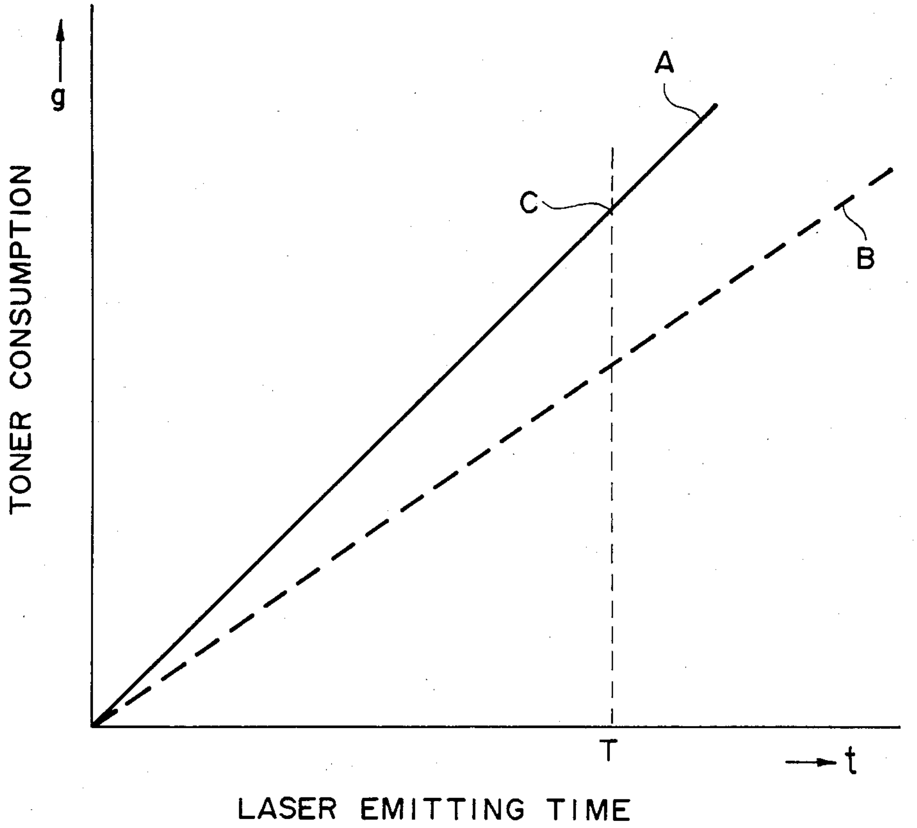
FIG. 5 illustrates a relation between the laser emitting time or period and the toner consumption.

FIG. 5 is a graph illustrating the difference in the toner consumption between the line image (line A) and a solid image (line B). As will be understood, the line image consumes a larger amount of toner because the edge effect is more influential to the line image. For this reason, the no-toner pre-warning (or warning) time is preferably determined by the toner consumption for the line image. Then, as will be understood from FIG. 5, the pre-warning signal is produced at the point of time c of the line A, so that the warning is representative of the images containing the solid image. The point of time at which the no-toner occurs, may be determined on the basis of the toner consumption of the solid image, or may be determined on the basis of a phantom line between the line A and line B.

Figure 6:
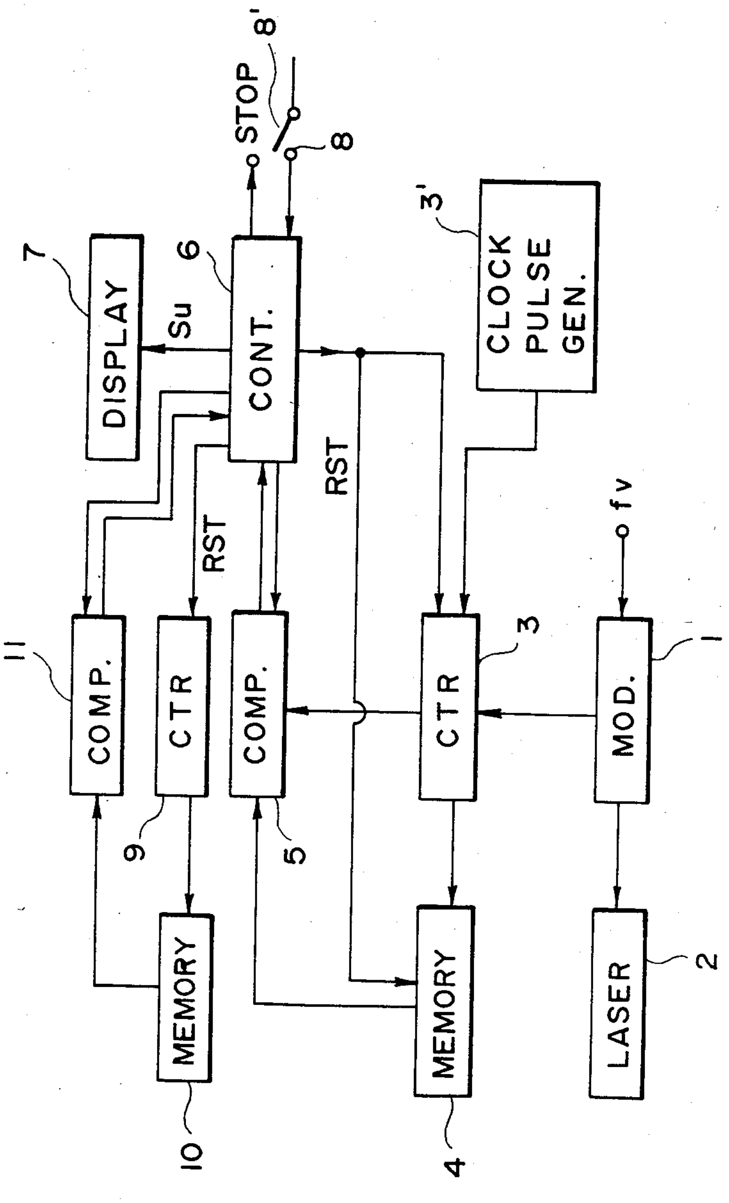
FIG. 6 is a block diagram illustrating the major part of an image recording apparatus according to another embodiment of the present invention.

FIG. 6 illustrates a second embodiment of the present invention. The same reference numerals are assigned to the corresponding parts of FIG. 4. The apparatus of this embodiment comprises a counter 9 which counts a number of prints, which are not employed in the first embodiment described in the foregoing. To the counter 9, a memory 10 for storing an integrated number of prints counted by the counter 9 is connected. To the counter 9, a comparator 11 is connected. When the count of the counter 9 reaches a predetermined level, preset in the comparator 11 by the controller 6 corresponding to a predetermined number of prints, the controller 6 produces a stop signal (STOP) to stop the image recording operation of the image recording apparatus. The stop signal is transmitted to various driving circuits of the various means for performing image recording, such as a driving circuit for the driving motor (not shown) for the photosensitive drum 101, the driving circuit for the driving motor (not shown) for the scanner 114 or the like; and stops the operation of those means and prevents image recording.

The counter 9 is reset by the signal 8 simultaneously with the counter 3. The number of prints which can be produced after the process cartridge replacing signal, that is, after actuation of the display means 7, maybe approximately 100. The cartridge replacing signal Su is produced to operate the display means 7 at a point in time immediately before the toner remaining in the developing device becomes (100X+y) g, where y (g) is the maximum of the toner consumption per one print which varies in accordance with the printing ratio, and y (g) is the limit in the amount of the remaining toner in the developing device 106 which does not produce a void in the visible part of the image. By a determination made in this manner, 100 prints can be produced after the prewarning signal; and thereafter, the apparatus is stopped. The number of prints which can be produced after the operation of the display means 7 and before the stop signal is not limited to 100, but other suitable numbers are usable.

In an image recording apparatus provided with means for controlling the image density, the toner consumption changes in accordance with the controlled image density. For example, in the apparatus wherein the image density is controlled by controlling the intensity of the laser output, the toner consumption per unit exposure period changes with the laser beam output intensity, namely, the driving current of the laser 2. In the apparatus wherein the image density is controlled by controlling a developing bias voltage applied to the developing roller 106', the toner consumption per unit exposure period changes with the controlled developing bias voltage level. In those machines, it is desirable that the signal level to be compared with the reference level is corrected so as to correspond to the factor of the image density. An embodiment for achieving this will be explained.

Figure 7:
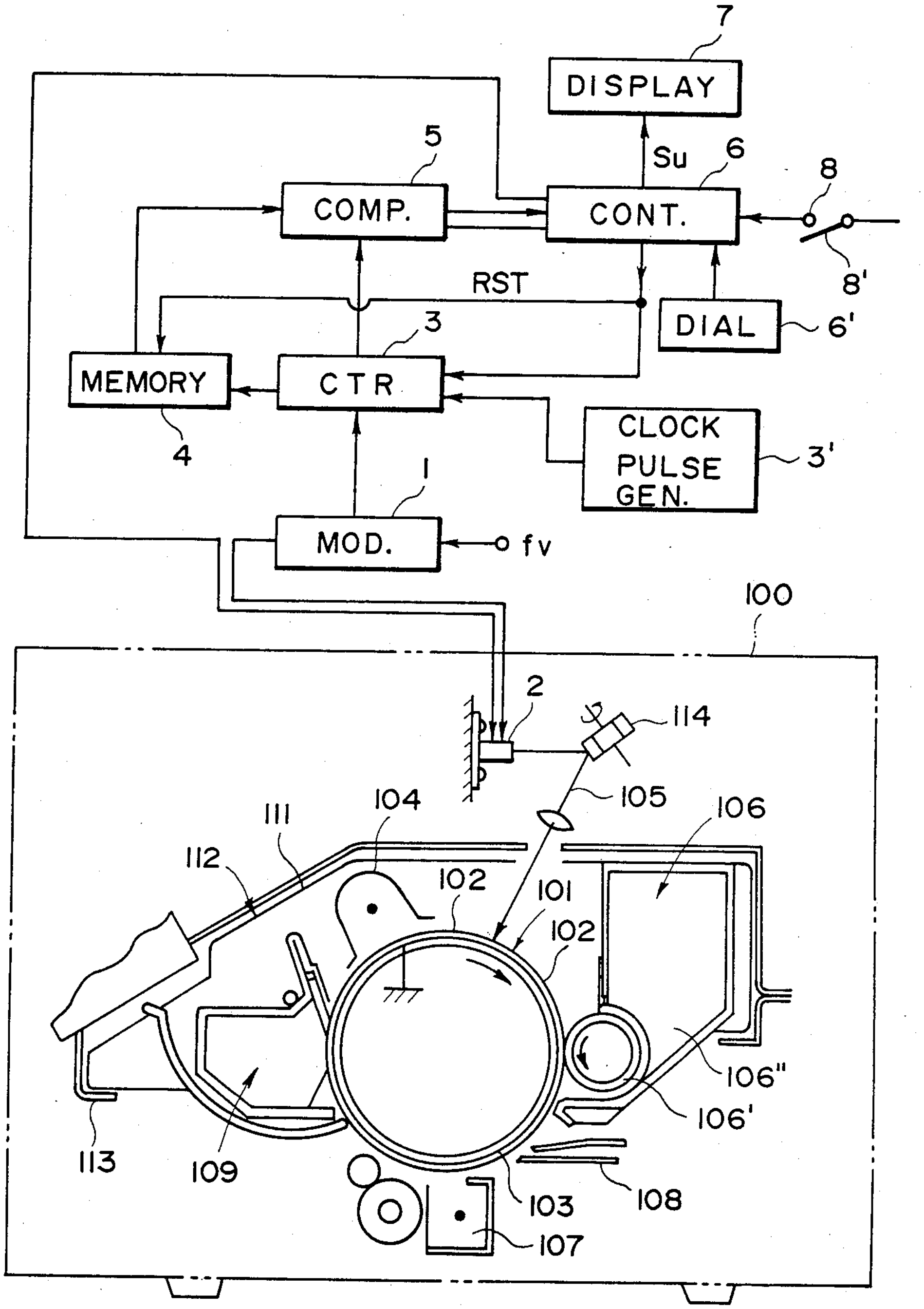
FIG. 7 is a partly schematic sectional view of an image recording apparatus according to a further embodiment of the present invention.

FIG. 7 illustrates such an embodiment which is similar to the embodiment illustrated in FIG. 4 with the exception that the laser 2 is connected to the controller 6. The controller 6 changes the laser output level of the laser 2 in accordance with the density signal manually set by a known image density controlling dial 6' or the like. As described hereinbefore, the toner consumption changes in accordance with the output of the laser 2. In other words, the higher output of the laser 2 results in a larger consumption of the toner, so that the service life of the process cartridge 112 decreases.

Figure 8:
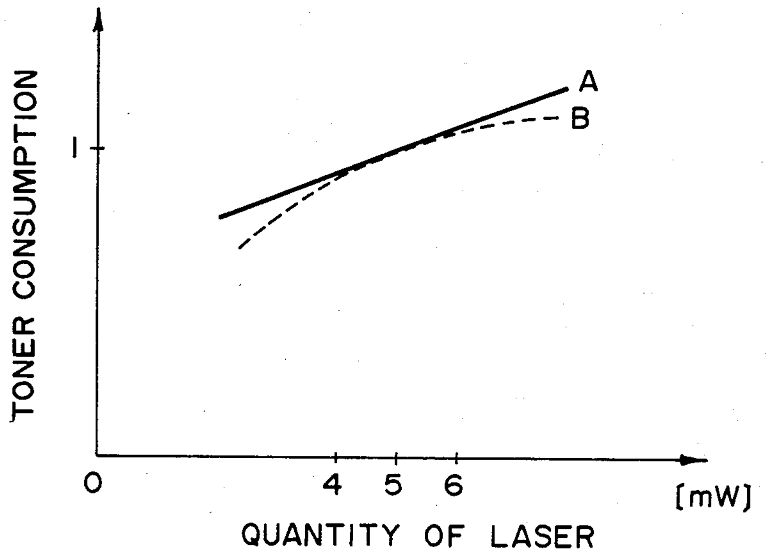
FIG. 8 illustrates a relation between the quantity of laser and the toner consumption.

FIG. 8 illustrates this relation. By the characteristic curve as shown in FIG. 8 being predetermined it is possible to correct to the amount to be stored in a memory 4 from the counter 3. The controller 6 is effective to change the output of the laser 2 and is also effective to change the amount of addition to the memory 4 from the counter 3. When the relation between the quantity of the laser beam and the toner consumption is predetermined as shown in FIG. 8, line A, the addition of the memory 4 given from the counter 3 is 1 per a unit period exposure when the laser output is 5 mW; whereas the addition is corrected to be 0.82 at 4.0 mW, and is corrected to be 1.08 at 6 mW. The inclination of the line A of FIG. 8 changes depending on individual machines and depending on the toner. The line is not necessarily a rectilinear line A, but may be a curve as shown by reference character B.

Figure 9:
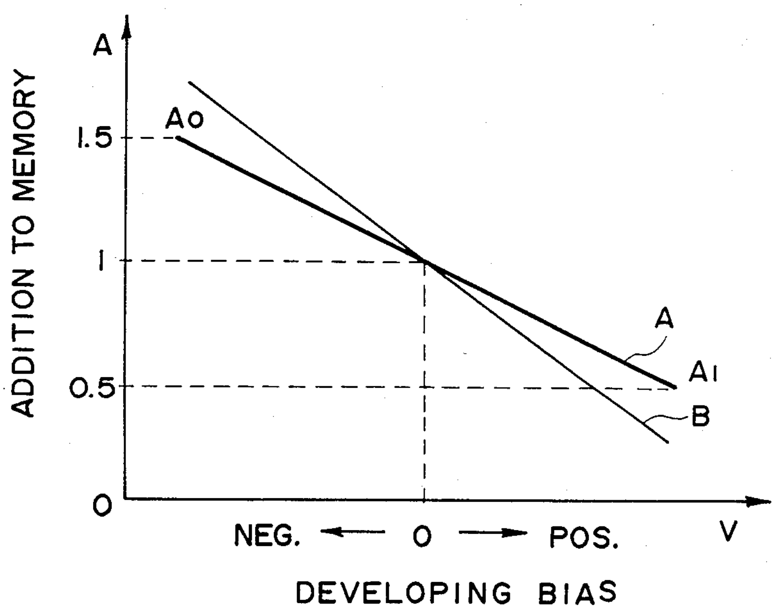
FIG. 9 illustrates a relation between a developing bias level and an amount of addition to a memory.

The devloping bias voltage applied to the developing roller 106' may be controlled by the controller 6 in response to the image density signal set by the image density control dial 6'. In this case, the amount of addition to the memory 4 from the counter 3 is corrected in accordance with the change of the developing bias voltage. For example, the amount of addition is 1 when the developing bias is set to be 0, for example, to provide the standard image density; and the amount of addition is set to be 1.5, for example, when the developing bias voltage is set to obtain a higher image density, that is, the developing bias voltage is set to be negative, as shown in FIG. 9, A0; on the other hand, when the negative developing bias voltage is set to obtain a low image density, the amount of addition is 0.5, for example, as shown in FIG. 9, A1. The memory 4 is thus controlled by the controller 8. The above-described example is based on the relation between the developing bias voltage and the amount of the addition to the memory (this relation corresponds to the relation between the developing bias voltage level and the toner consumption per unit exposure time), is as indicated by the line A of FIG. 9. However, the inclination of the line can change depending on individual machines and toning agents used, for example, as shown by line B, also, it may be not a rectilinear line but may be a curve.

It is possible to add to the apparatus of FIG. 7 embodiment, the counter 9, the memory 10 the comparator 11 as shown in FIG. 6, whereby after the display means 7 is turned on, a predetermined number of prints can be produced; only thereafter, the image recording operation is stopped; and the image recording operation is prevented before the reset signal 8 is applied to the controller 6.

In the foregoing description, a laser beam printer is used, but a light emitting diode (LED) array or an optical fiber tube (OFT) or the like may be used in place of the laser beam for the exposure means which produces a modulated beam in accordance with the signals to be recorded.

Also, the developing device has been described as being of a reversal development type, but the present invention is applicable to the case where the part of the photosensitive member for forming a visible portion of the image by depositing the toner, for example a letter portion or a line portion, is not exposed to the light, and the background portion of the image is exposed to the laser beam or the like. In this case, the non-exposure period of time by the modulated beam generating source such as a laser or the like is counted during the image recording operation, so that the control operation described with the foregoing embodiments can be used.

In the embodiments described above, the time of the process cartridge replacement is destermined on the basis of the toner consumption, that is, the degree of consumption of the process cartridge is determined on the basis of the presence or absence of the toner. The process cartridge contains at least the photosensitive drum and the developer. However, in the type of the apparatus wherein the replacement of the process cartridge, namely, the degree of consumption or wearing of the process cartridge 112, is determined in accordance with the deterioration of the photosensitive drum 101 or the amount of the residual toner contained in the cleaner, it is not necessary for the process cartridge to contain the developer. In those cases, the cartridge 112 at least contains the photosensitive drum or contains at least the photosensitive drum and the cleaner. The predetermined reference level to be compared with the signal level corresponding to the exposure or non-exposure period, is determined corresponding to an integral exposure period required for the photosensitive drum to deteriorate to a non-practical extent or the integrated exposure period required for the cleaner is filled with the residul toner.

While the invention has been described with reference to the structures disclosed herein, it is not confined to the details set forth and this application is intended to cover such modifications or changes as may come within the purposes of the improvements or the scope of the following claims.

What is claimed is:

1. An image recording apparatus, comprising:
- supporting means for detachably supporting a disposable part adapted to be used for recording an image;
- means for generating a beam which is modulated in accordance with a signal of said image to be recorded, a photosensitive member being exposed to the beam generated by said generating and modulating means;
- time signal generating means for generating a time signal;
- means for integrating the time signal produced by said time signal generating means in accordance with the duration of the signal of the image to be recorded; and
- replacement signal generating means for generating a predetermined signal for calling an operator's attention to the need for replacement of said disposable part of said apparatus on the basis of the integration by said integration means.

2. An apparatus according to claim 1, further comprising display means for displaying said signal from said replacement signal generating means.

3. An apparatus according to claim 2, further comprising control means for preventing the image forming operation of said apparatus in response to a signal from said signal generating means.

4. An apparatus according to claim 3, wherein said control means prevents the image forming operation at a point of time which is later than a point of time when said display means operates.

5. An apparatus according to any one of preceding claims, wherein said disposable part is a cartridge containing said photosensitive member and at least one electrophotographic process means.

6. An apparatus according to claim 5, wherein said cartridge contains developing means as one of said electrophotographic process means.

7. An apparatus according to claim 6, wherein said generating and modulating means forms a beam modulated in accordance with at least two image signals, wherein said at least two image signals comprise at least two picture element signals, wherein one of the picture element signals corresponds to a half-tone picture element, and the duration of the picture element signal corresponding to the half-tone picture element is shorter than the duration of the other picture element signal.

8. An apparatus according to claim 6, further comprising means for correcting the operation of said measuring means in accordance with a change in a factor influencing the density of an image produced by said apparatus.

9. An apparatus according to claim 1, in combination with said photosensitive member.

10. An apparatus according to claim 1 in combination with said disposable part.

11. An apparatus according to claim 2, wherein said display means is responsive to said signal from said replacement signal generating means.

12. An apparatus according to claim 8, wherein said apparatus further comprises means for changing the image density of said recorded image, wherein said correcting means corrects the operation of said measuring means in accordance with a change in the image density of said recorded image. operation of said measuring means in accordance with a change in the image density of said recorded image due to a change in the intensity of said beam by said controller.

13. An apparatus according to claim 12, wherein said image density changing means comprises a controller for changing the intensity of said beam so as to change the density of said image, wherein said correction means corrects the operation of said measuring means in accordance with a change in the image density of said recorded image due to a change in the intensity of said beam by said controller.

14. An apparatus according to claim 12, wherein said apparatus further comprises a developing roller for developing said recorded image and wherein said image density changing means comprises means for controlling the bias voltage applied to said developing roller so as to change the density of said recorded image, wherein said correction means corrects the operation of said measuring means in accordance with a change in the image density of said recorded image due to a change in said bias voltage by said controlling means.

* * * * *

UNITED STATES PATENT AND TRADEMARK OFFICE
CERTIFICATE OF CORRECTION

PATENT NO. : 4,707,748

DATED : November 17, 1987

INVENTOR(S) : Yasumasa Ohtsuka, et al.

It is certified that error appears in the above-identified patent and that said Letters Patent is hereby corrected as shown below:

AT [57] IN THE ABSTRACT:

Line 3, "imagewisely" should read --imagewise---.
Line 7, "recorded being" should read --recording is being--.

COLUMN 1

Line 7, "imager-" should read --image---.
Line 48, "worn out" should read --worn-out--.

COLUMN 2

Line 6, "of" (second occurrence) should read --or--.
Line 11, "warn" should read --worn--.
Line 24, delete "is" (second occurrence).
Line 43, "indicatesa" should read --indicates a--.
Line 48, "signal 1" should read --signal (1)--.
Line 55, "corrected" should read --collected--.
Line 62, "correct" should read --accurate--.

COLUMN 5

Line 7, "no-toner occurs," should read --no-toner pre-warning occurs,--.
Line 35, "maybe" should read --may be--.
Line 39, "(100X + y)g," should read (100x + y)g,--.
Line 39, "y (g)" should read --x (g)--.

UNITED STATES PATENT AND TRADEMARK OFFICE

CERTIFICATE OF CORRECTION

PATENT NO. : 4,707,748
DATED : November 17, 1987
INVENTOR(S) : Yasumasa Ohtsuka, et al.

It is certified that error appears in the above-identified patent and that said Letters Patent is hereby corrected as shown below:

COLUMN 6

Line 14, "correct to" should read --correct--.
Line 56, "10 the" should read --10, the--.

COLUMN 7

Line 30, "drum" should read --drum,--.
Line 37, "is" should read --to be--.
Line 39, "residul" should read --residual--.

COLUMN 8

Line 24, "half-tone" should read --halftone--.
Line 26, "half-tone" should read --halftone--.
Line 36, "claim 1" should read --claim 1,--.
Lines 46-8, delete ". operation of said measuring means in accordance with a change in the image density of said recorded image" (duplicated).

Signed and Sealed this

Third Day of May, 1988

*Attest:*

DONALD J. QUIGG

*Attesting Officer*

*Commissioner of Patents and Trademarks*